United States Patent
He et al.

(10) Patent No.: US 12,184,941 B2
(45) Date of Patent: Dec. 31, 2024

(54) LIVE STREAMING INTERFACE DISPLAY METHOD, AND DEVICE

(71) Applicant: Beijing Bytedance Network Technology Co., Ltd., Beijing (CN)

(72) Inventors: Jingting He, Beijing (CN); Xuyuan Xiang, Beijing (CN); Wenjing Liu, Beijing (CN); Zijun Wei, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/329,885

(22) Filed: Jun. 6, 2023

(65) Prior Publication Data
US 2023/0328330 A1 Oct. 12, 2023

Related U.S. Application Data

(63) Continuation of application No. PCT/CN2021/134902, filed on Dec. 1, 2021.

(30) Foreign Application Priority Data

Dec. 8, 2020 (CN) .......................... 202011444687.X

(51) Int. Cl.
H04N 5/445 (2011.01)
H04N 21/2187 (2011.01)
(Continued)

(52) U.S. Cl.
CPC ..... *H04N 21/4788* (2013.01); *H04N 21/2187* (2013.01); *H04N 21/488* (2013.01)

(58) Field of Classification Search
CPC ........... H04N 21/4788; H04N 21/2187; H04N 21/488
(Continued)

(56) References Cited

U.S. PATENT DOCUMENTS 10,095,390 B1 * 10/2018 Lewis ................ H04N 21/8455
11,082,467 B1 * 8/2021 Hartnett ................ H04L 65/403
(Continued)

FOREIGN PATENT DOCUMENTS

CN 106028161 A 10/2016
CN 107911733 A 4/2018
(Continued)

OTHER PUBLICATIONS

China National Intellectual Property Administration, International Search Report and Written Opinion Issued in Application No. PCT/CN2021/134902, Feb. 24, 2022, WIPO, 13 pages.
(Continued)

*Primary Examiner* — Jefferey F Harold
*Assistant Examiner* — Sahar Aqil Riaz
(74) *Attorney, Agent, or Firm* — Alleman Hall & Tuttle LLP

(57) ABSTRACT

Embodiments of the present disclosure provide a live streaming interface display method, a device, an electronic device, and a storage medium. The live streaming interface display method is applied to a terminal device and the terminal device accesses a live streaming room. The method includes: determining at least one piece of popular comment content in the live streaming room in a current counting period; and distinguishingly displaying, on a live streaming interface of the live streaming room, the popular comment content and real-time comment content in the live streaming room.

18 Claims, 6 Drawing Sheets

(51) Int. Cl.
*H04N 21/4788* (2011.01)
*H04N 21/488* (2011.01)

(58) Field of Classification Search
USPC .......................................................... 725/37
See application file for complete search history.

(56) References Cited

U.S. PATENT DOCUMENTS

| | | | |
|---|---|---|---|
| 2013/0260896 A1* | 10/2013 | Miura ..................... | A63F 13/47 463/42 |
| 2017/0277268 A1* | 9/2017 | Ono ........................ | G06F 16/00 |
| 2018/0091468 A1 | 3/2018 | Yong et al. | |
| 2018/0124477 A1 | 5/2018 | Qu et al. | |
| 2018/0338182 A1 | 11/2018 | Earley et al. | |
| 2018/0349347 A1* | 12/2018 | Ringger ............. | G06Q 30/0251 |
| 2019/0394507 A1* | 12/2019 | Hardee ............. | H04N 21/2187 |
| 2021/0044640 A1* | 2/2021 | He ......................... | G10L 15/26 |
| 2021/0058678 A1* | 2/2021 | Shibata .............. | H04N 21/4316 |
| 2021/0127171 A1* | 4/2021 | Liu ....................... | G06F 3/0488 |
| 2021/0266631 A1* | 8/2021 | Geng .................... | H04N 21/431 |
| 2022/0004581 A1* | 1/2022 | Zhu ..................... | G06F 16/9577 |
| 2022/0150551 A1* | 5/2022 | Mizuta ................... | G06T 7/223 |
| 2022/0295135 A1* | 9/2022 | Kimata ............. | H04N 21/4758 |
| 2022/0385989 A1* | 12/2022 | Qiang ............. | H04N 21/47202 |

FOREIGN PATENT DOCUMENTS

| | | |
|---|---|---|
| CN | 108401175 A | 8/2018 |
| CN | 109275012 A | 1/2019 |
| CN | 109379614 A | 2/2019 |
| CN | 109918656 A | 6/2019 |
| CN | 110309169 A | 10/2019 |
| CN | 111246227 A | 6/2020 |
| CN | 111414543 A | 7/2020 |
| CN | 111669657 A | 9/2020 |
| CN | 111695974 A | 9/2020 |
| CN | 111813944 A | 10/2020 |
| EP | 2731332 A1 | 5/2014 |
| JP | 2011151741 A | 8/2011 |
| JP | 2013229873 A | 11/2013 |
| JP | 2018157465 A | 10/2018 |
| WO | 2015038351 A1 | 3/2015 |

OTHER PUBLICATIONS

China National Intellectual Property Administration, Office Action Issued in Application No. 202011444687X, Mar. 17, 2023, 10 pages. Submitted with some English translation.
China National Intellectual Property Administration, Office Action and Search Report Issued in Application No. 202011444687.X, Mar. 5, 2024, 7 pages.
European Patent Office, Extended European Search Report Issued in Application No. 21902460.1, Feb. 16, 2024, 8 pages.
China National Intellectual Property Administration, Office Action and Search Report Issued in Application No. 202011444687.X, Nov. 14, 2023, 16 pages.
Japan Patent Office, Office Action Issued in Application No. 2023-528366, May 14, 2024, 14 pages.
European Patent Office, Office Action Issued in Application No. 21902460.1, Oct. 31, 2024, Netherlands, 6 pages.
Japan Patent Office, Notice of Allowance Issued in Application No. 2023528366, Oct. 22, 2024, 5 pages.

* cited by examiner

LIVE STREAMING INTERFACE DISPLAY METHOD, AND DEVICE

CROSS-REFERENCE TO RELATED APPLICATIONS

This application is a continuation of International Application No. PCT/CN2021/134902, filed on Dec. 1, 2021, which claims priority to Chinese Patent Application No. 202011444687.X, filed on Dec. 8, 2020, both of which are hereby incorporated by reference in their entireties.

TECHNICAL FIELD

Embodiments of the present disclosure relates to the field of computer technology, and in particular, to a live streaming interface display method, a device, an electronic device, and a storage medium.

BACKGROUND

Live video streaming is a way of interaction through a video between a streaming host and a viewer. The streaming host can create a live streaming room. When the viewer enters the live streaming room, it means that a terminal device that the viewer is using, which will be referred to as a viewer terminal hereunder, accesses the live streaming room. Subsequently, the viewer terminal can receive video data sent by a terminal device used by the streaming host of the live streaming room, so that the viewer can see, on a live streaming interface displayed by the viewer terminal, the streaming host, an object the streaming host is displaying and an environment where the streaming host is.

In a prior art, in addition to a video containing the streaming host, the object the streaming host is displaying and the environment where the streaming host is, comment content posted by a viewer who enters the live streaming room created by the streaming host may also be displayed on the mentioned live streaming interface. The comment content may be displayed in real-time in a comment display area of the live streaming interface according to post time of the comment content. Specifically, each piece of comment content, upon being posted, is displayed immediately in a sub-area of the comment display area, and disappears after being displayed for a preset time period.

However, the mentioned solution has a problem of a poor experience of watching live streaming for a viewer.

SUMMARY

Embodiments of the present disclosure provide a live streaming interface display method, a device, an electronic device, and a storage medium, to overcome the current problem of a poor experience of watching live streaming for a viewer.

In a first aspect, an embodiment of the present disclosure provides a live streaming interface display method, where the method is applied to a terminal device and the terminal device accesses a live streaming room, and the method includes:
  determining at least one piece of popular comment content in the live streaming room in a current counting period; and
  distinguishingly displaying, on a live streaming interface of the live streaming room, the popular comment content and real-time comment content in the live streaming room.

In a second aspect, an embodiment of the present disclosure provides a terminal device, where the terminal device accesses a live streaming room, and includes:
  a popular comment determining module, configured to determine at least one piece of popular comment content in the live streaming room in a current counting period; and
  a comment content displaying module, configured to distinguishingly display, on a live streaming interface of the live streaming room, the popular comment content and real-time comment content in the live streaming room.

In a third aspect, an embodiment of the present disclosure provides an electronic device, including: at least one processor and a memory,
  where the memory stores computer-executed instructions; and
  the at least one processor executes the computer-executed instructions stored in the memory, to cause the electronic device to implement the method according to the foregoing first aspect.

In a fourth aspect, an embodiment of the present disclosure provides a computer-readable storage medium, storing computer-executed instructions which, when being executed by a computing device, causes the computing device to implement the method according to the foregoing first aspect.

In a fifth aspect, an embodiment of the present disclosure provides a computer program which, when being executed by a computing device, causes the computing device to implement the method according to the foregoing first aspect.

The embodiments of the present disclosure provide a live streaming interface display method, a device, an electronic device, and a storage medium. The method is applied to a terminal device and the terminal device accesses a live streaming room, and the method includes: determining at least one piece of popular comment content in the live streaming room in a current counting period; and distinguishingly displaying, on a live streaming interface of the live streaming room, the popular comment content and real-time comment content of the live streaming room. According to the embodiments of the present disclosure, the popular comment content and the real-time comment content can be displayed distinguishingly on the live streaming interface, so as to enable a viewer to perceive, according to the popular comment content, an overall feeling of all viewers with respect to a live streaming within a period of time, thereby improving user experience of watching a live streaming.

BRIEF DESCRIPTION OF DRAWINGS

In order to describe the technical solutions in embodiments of the present disclosure or the prior art more clearly, the following will briefly introduce the drawings that need to be used in the description of the embodiments of the present disclosure or the prior art. Obviously, the drawings in the following description are for some embodiments of the present disclosure. For those of ordinary skill in the art, other drawings may be obtained based on these drawings without creative efforts.

DESCRIPTION OF EMBODIMENTS

In order to make the purpose, technical solutions and advantages of embodiments of the present disclosure more clearly, the technical solutions of the embodiments of the present disclosure will be described hereunder clearly and comprehensively in conjunction with the accompanying drawings of the embodiments of the present disclosure. Obviously, the described embodiments are some of, rather than all of the embodiments of the present disclosure. Based on the embodiments in the present disclosure, all other embodiments obtained by those of ordinary skill in the art without creative efforts shall fall within the protection scope of present disclosure.

Figure 1:
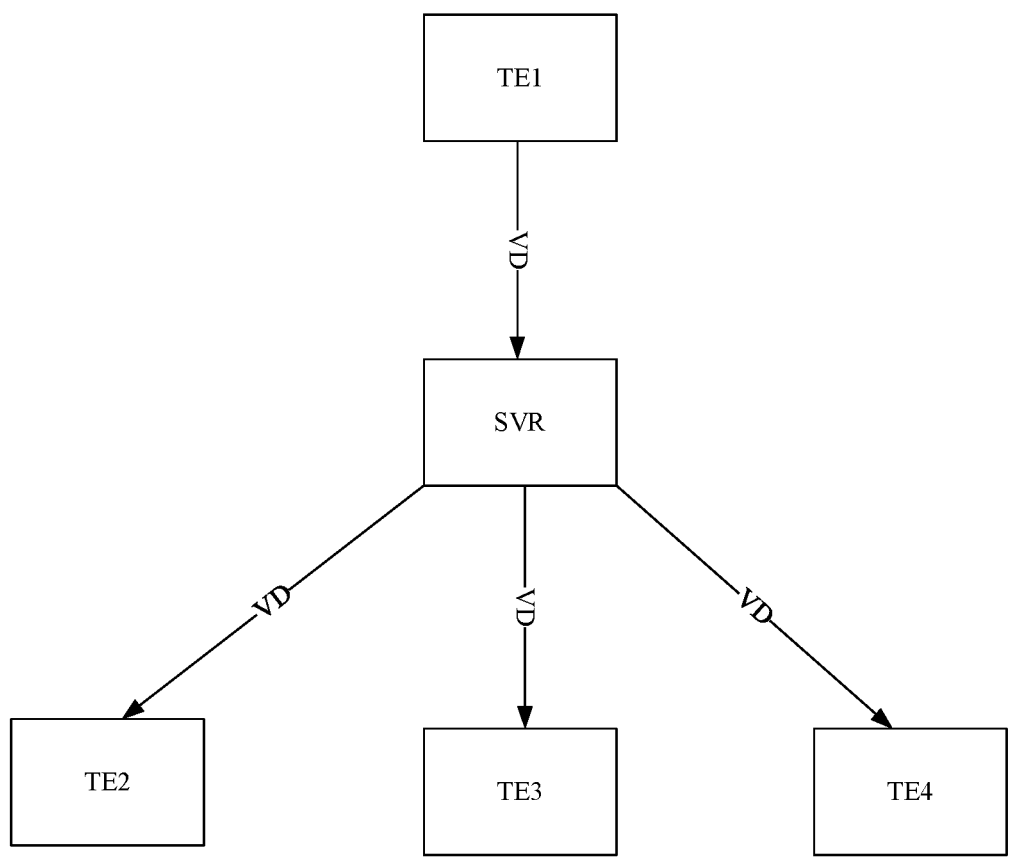
FIG. 1 illustratively shows a schematic diagram of video data transmission in a live video streaming scenario provided by an embodiment of the present disclosure.

Embodiments of the present disclosure can be applied to a live video streaming scenario. In a live video streaming process, one or more streaming hosts communicate with one or more viewers by means of a video. Each streaming host uses a streaming host terminal, and each viewer uses a viewer terminal. In a live streaming process, a live streaming room is created by a streaming host, and a viewer terminal can access the live streaming room and interact with the streaming host of the live streaming room. Please refer to FIG. 1. FIG. 1 illustratively shows a schematic diagram of video data transmission in a live video streaming scenario provided by an embodiment of the present disclosure. FIG. 1 shows four terminal devices: TE1, TE2, TE3 and TE4, and a server SVR, where TE1 is a streaming host terminal, and TE2, TE3 and TE4 are viewer terminals corresponding to three viewers respectively. In the live video streaming process, TE1 receives video data (VD) of a streaming host, and sends the VD to the SVR. The SVR sends the VD to the TE2, TE3 and TE4 respectively. TE2, TE3 and TE4, upon receiving the VD sent by SVR, parse and play the VD, so that the viewers can see the streaming host, an object the streaming host is displaying and an environment where the streaming host is.

In a prior art, in the mentioned live video streaming process, a live streaming interface displayed by a viewer terminal not only displays video data VD, but also displays comment content, with regard to the live streaming, posted by a viewer who enters the live streaming room. The comment content may be displayed in real-time in a comment display area of the live streaming interface according to post time of the comment content. Specifically, each piece of comment content, upon being posted, may be displayed in a position in the comment display area, and disappears after being displayed for a preset time period.

Figure 2:
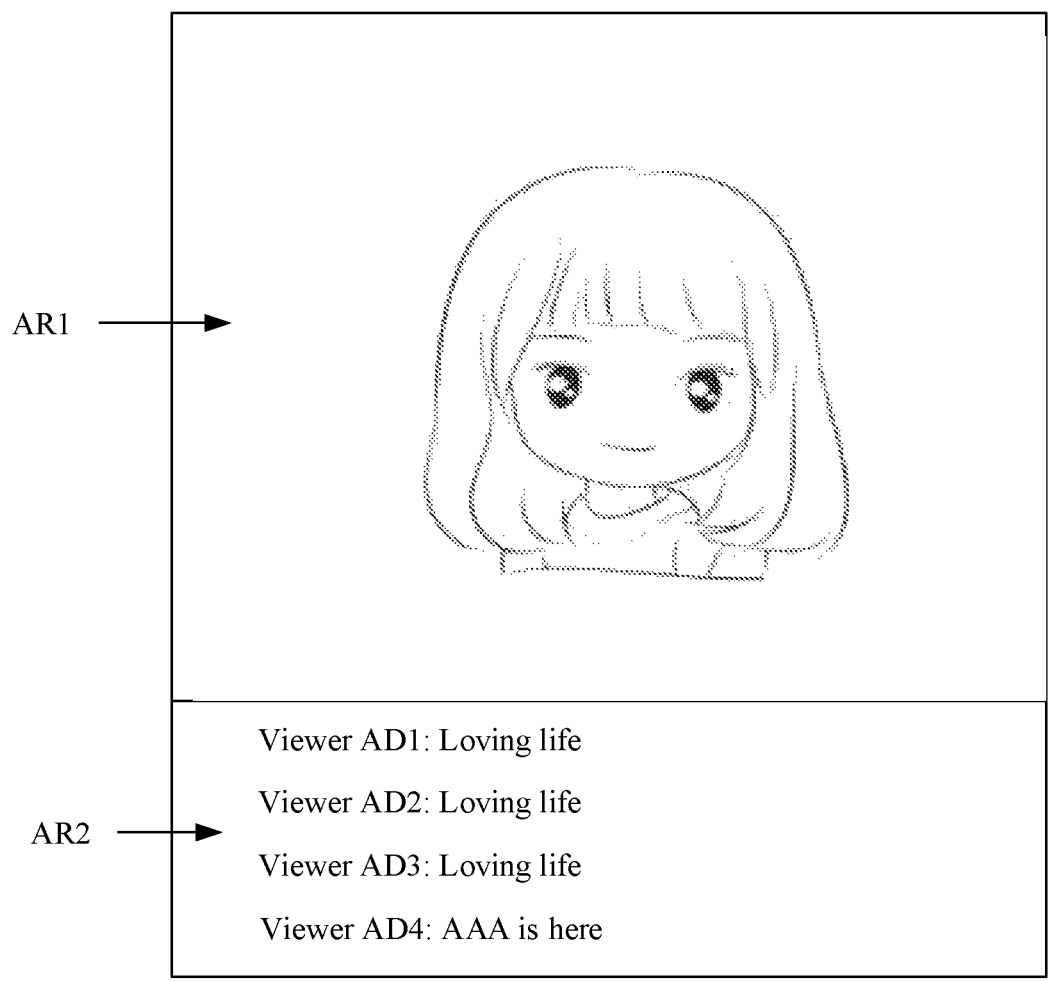
FIG. 2 and FIG. 3 illustratively show schematic diagrams of live streaming interfaces corresponding to two time instants respectively in a prior art.
Figure 3:
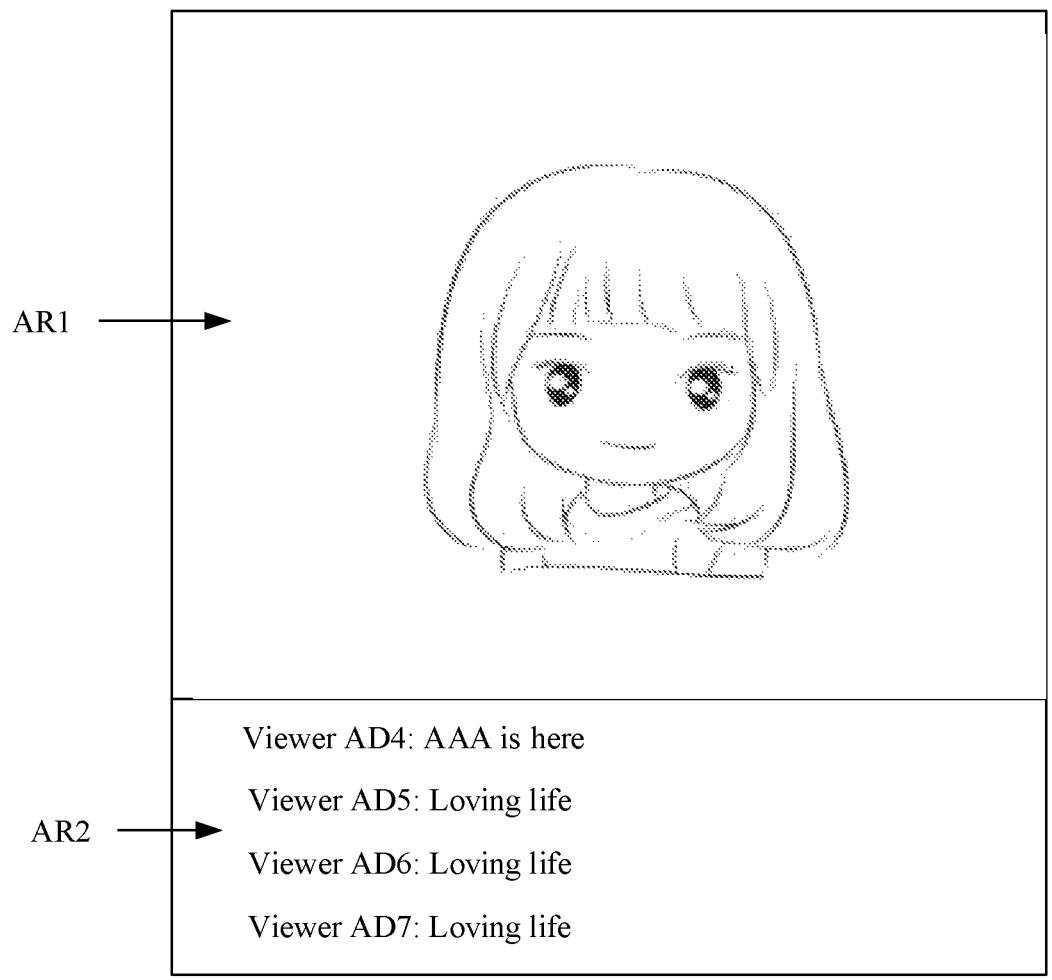

FIG. 2 and FIG. 3 illustratively show schematic diagrams of live streaming interfaces corresponding to two time instants t1 and t2 respectively in a prior art, where t1<t2. AR1 and AR2 are respectively a video display area and a comment display area, where the video display area is used for displaying a video sent from a streaming host terminal, and the comment display area is used for displaying comment content posted by a viewer. At time instant t1, displayed on the live streaming interface is comment content recently posted: "Loving life" posted by viewers AD1 to AD3, and "AAA is here" posted by viewer AD4. At time instant t2, displayed on the live streaming interface is comment content posted up to the minute: "AAA is here" posted by viewer AD4, and "Loving life" posted by viewers AD5 to AD7. It can be seen that, as time goes by, the comment content of viewers AD1 to AD3 displayed at time instant t1, is no longer displayed at time instant t2. Furthermore, displayed at time instant t2 is the comment content posted up to the minute: "Loving life" posted by viewers AD5 to AD7.

However, in the foregoing solution, any viewer can only see current comment content of a few viewers about the live streaming, and cannot know comment content of most viewers about the live streaming, resulting in the problem of a poor experience of watching live streaming for a viewer.

In view of the foregoing, embodiments of the present disclosure provide a live streaming interface display method and a device, which may be applied to a terminal device. The terminal device may be a view terminal and accesses a live streaming room. Firstly, the terminal device determines at least one piece of popular comment content in the live streaming room in a current counting period. It should be understood that the popular comment content is comment content that occupies a relatively larger count among comment content in the live streaming room in the current counting period. Subsequently, the terminal device distinguishingly displays, on a live streaming interface of the live streaming room, the popular comment content and real-time comment content in the live streaming room. According to the embodiments of the present disclosure, the popular comment content and the real-time comment content can be displayed distinguishingly on the live streaming interface, so as to enable a viewer to perceive, according to the popular comment content, an overall feeling of all viewers with respect to a live streaming within a period of time, thereby improving user experience of watching a live streaming.

The following will describe in detail, through specific embodiments, technical solutions of embodiments of the present disclosure and how the technical solutions of the present disclosure solve the mentioned technical problem. The following several specific embodiments may be combined with each other, and same or similar concepts or processes may not be described repeatedly in certain embodiments. The following will describe the embodiments of the present disclosure with reference to the accompanying drawings.

Figure 4:
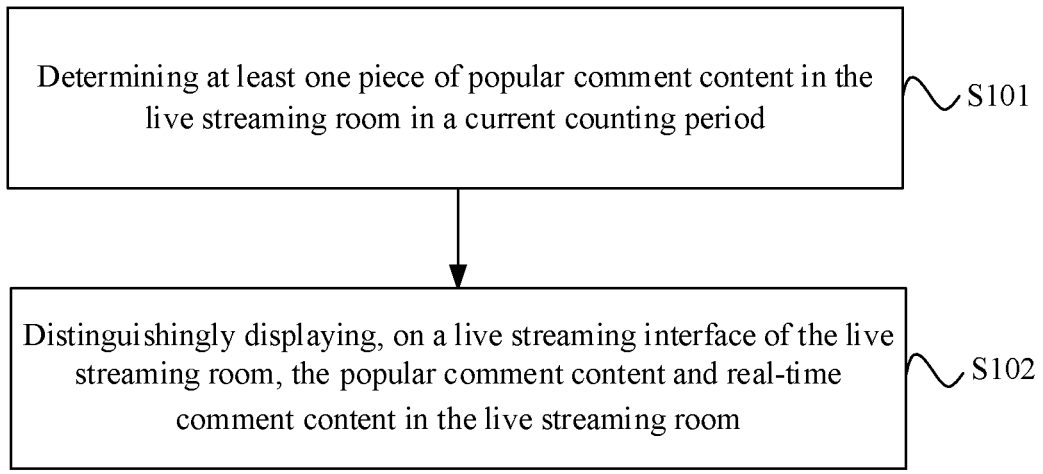
FIG. 4 illustratively shows a flowchart of a live streaming interface display method provided by an embodiment of the present disclosure.

Please refer to FIG. 4. FIG. 4 is a flowchart of steps of a live streaming interface display method provided by an embodiment of the present disclosure. The method as shown in FIG. 4 can be applied to a terminal device. The terminal device accesses a live streaming room. The live streaming interface display method includes:

S101: determining at least one piece of popular comment content in the live streaming room in a current counting period.

The popular comment content is comment content that occupies a relatively larger count among comment content in the live streaming room in the current counting period. The comment content that occupies a relatively larger count may be comment content, a count of which is greater than or equal to a preset count threshold value, and/or, at least one piece of comment content at a front position of a ranking in a descending order according to a count.

In addition, since a count of comment content in a unit time (which will be referred to as a rate hereunder) may be determined according to a count of the comment content and a time length of the current counting period, the popular comment content may also be comment content with a relative higher rate among the comment content in the live streaming room in the current counting period. The comment content with a relative higher rate may be comment content with a rate greater than or equal to a rate threshold, and/or, some comment content at front positions of a ranking in a descending order according to rates of the comment content.

It should be understood that, in a current counting period, since the time length of the current counting period is certain, the popular comment content determined according to the count is the same as the popular comment content determined according to the rate.

It should be noted that the mentioned comment content is comment content posted by a viewer who enters the live streaming room.

In an example of the embodiment of the present disclosure, a length of the mentioned popular comment content is less than or equal to a length threshold value.

The length of the popular comment content and the length threshold value may be represented by the number of words included in the popular comment content. When a length of comment content is relatively greater, there may be few comment content containing same content. In an extreme case, any two pieces of comment content are different, and a count of each piece of comment content is 1, and therefore, the popular comment content cannot be accurately determined. In order to obtain relatively accurate popular comment content, in the embodiment of the present disclosure, the length of the popular comment content is limited to be within the length threshold value, so as to increase as much as possible the same comment content, and prompt as much as possible that all the counts of the comment content are not 1, which is helpful to improve the accuracy of the popular comment content.

S102: distinguishingly displaying, on a live streaming interface of the live streaming room, the popular comment content and real-time comment content in the live streaming room.

The real-time comment content is comment content posted at a current time by a viewer who enters the live streaming room. The real-time comment content is usually displayed on the live streaming interface immediately after being posted.

Figure 5:
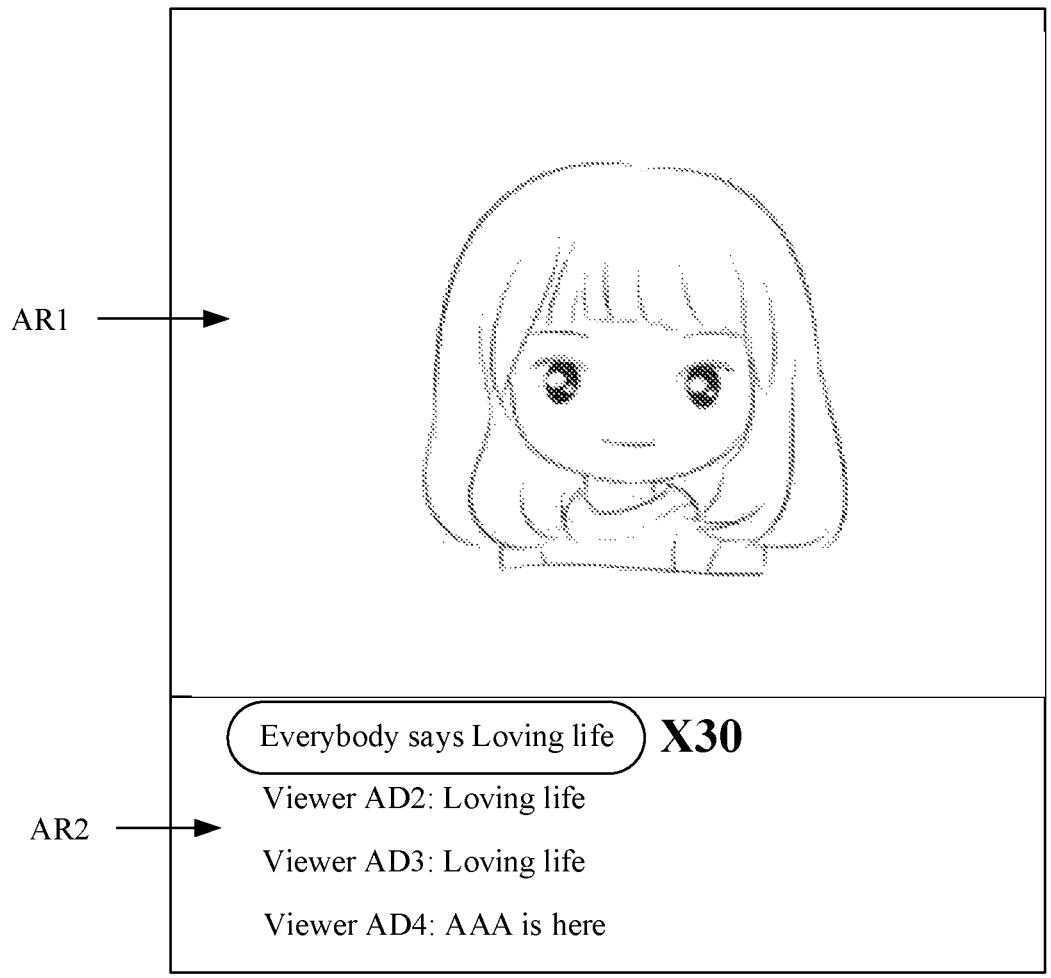
FIG. 5 and FIG. 6 illustratively show schematic diagrams of live streaming interfaces corresponding to two time instants respectively provided by embodiments of the present disclosure.

For example, the popular comment content and the real-time comment content may be distinguishingly displayed on the live streaming interface through the following modes. Mode 1: display the popular comment content and the real-time comment content separately in two areas. Mode 2: display the popular comment content and the real-time comment content in a same area at different time instants. For example, the popular comment content is displayed in the comment display area in first 10 seconds of every minute, and the real-time comment content is displayed in the comment display area in subsequent 50 seconds of every minute. Mode 3: display a label before or after the popular comment content, or before or after the real-time comment content, where the label is used to distinguish the popular comment content from the real-time comment content. For example, as shown in FIG. 5, before the popular comment content "Loving life", a label "everybody says" is displayed. Mode 4: distinguishingly display the popular comment content and the real-time comment content through different forms. For example, the popular comment content and the real-time comment content are distinguishingly displayed in different font sizes and colors, or the popular comment content is displayed in highlight and the real-time comment content is displayed regularly, or the popular comment content is displayed with dynamic flashes and the real-time comment content is displayed regularly.

It should be understood that, in different counting periods, the popular comment content may be different. Therefore, from a perspective of the viewers, the popular comment content is also content that is dynamically changing.

In an example of the embodiment of the present disclosure, at least one of the following is further displayed on the live streaming interface: a count of the popular comment content in the current counting period; a count in a unit time, which is determined according to the count and the current counting period; a count of the popular comment content since creation of the live streaming room to a current time.

The count in a unit time, which is determined according to the count in the current counting period and the current counting period, is the rate of the popular comment content in S101.

The mentioned count of the popular comment content since the creation of the live streaming room to the current time is a sum of counts of the popular comment content in the live streaming room in one or more counting periods since the creation of the live streaming room. This count may also restart from 0 when it reaches a certain count.

In an embodiment of the present disclosure, the count of the popular comment content counted in one of the foregoing dimensions may be displayed, which is helpful for the viewers to obtain detailed information about the popular comment content more clearly and accurately. The "×30" in FIG. 5 may be a count of the popular comment content "Loving life" in the current counting period, or a count in a unit time, which is determined according to the count in the current counting period and the current counting period, or a count of the popular comment content "Loving life" since the creation of the live streaming room to the current time.

In an example of the embodiment of the present disclosure, the mentioned distinguishingly displaying, on the live streaming interface of the live streaming room, the popular comment content and the real-time comment content in the live streaming room, specifically is:

upon receiving an operation instruction to a comment input area on the live streaming interface, displaying the popular comment content on the live streaming interface of the live streaming room.

The comment input area is used for inputting comment content, and the operation instruction by a viewer to the comment input area represents that the viewer wants to input comment content. At this time, the popular comment content may be displayed according to the embodiment of the present disclosure, a user may select one piece of target popular comment content from the displayed popular comment content as input comment content, and the input comment content may be displayed on the live streaming interface as real-time comment content. The user may select the target popular comment content through a click or touch operation. In an implementation, when the user clicks or touches the target popular comment content, the target popular comment content is sent as a default. In another implementation, when the user clicks or touches the target popular comment content, the target popular comment content is displayed in the comment input area, and when the user performs an operation of clicking sending, the sending of the comment content is achieved. In this way, the operation complexity for the viewer to input comment content can be reduced, so that the viewer can input the comment content quickly.

It should be understood that, there are three modes for displaying the popular comment content. Mode 1: always display the popular comment content on the live streaming interface. Mode 2: display the popular comment content on the live streaming interface upon an operation made by the viewer to the comment input area. Mode 3: divide the comment display area into a first sub-area and a second sub-area, always display the popular comment content in the first sub-area and the real-time comment content in the second sub-area, and further display the popular comment content in an operable third sub-area upon an operation made to the comment input area, where the third sub-area is not in the comment display area.

In an example of the embodiment of the present disclosure, the mentioned popular comment content is displayed in a preset distance range from the comment input area.

Specifically, the popular comment content may be displayed in the preset distance range in any direction (such as leftward, rightward, upward, downward, etc.) of the comment input area. In this way, a distance between the popular comment content and the comment input area can be ensured to be short, so that a duration of a finger movement of the viewer between an operation to the comment input area and an operation to one piece of target popular comment content is shortened, thereby, improving the operation efficiency.

In an example of the embodiment of the present disclosure, the method further includes:
upon receiving an operation instruction to one piece of target popular comment content from the popular comment content, displaying, on the live streaming interface of the live streaming room, the target popular comment content as real-time comment content.

The operation instruction to the one piece of target popular comment content in the popular comment content may be an operation instruction made by the viewer for an operation (such as a click, a drag, a long-press or the like) to the one piece of target popular comment content in the popular comment content.

In the embodiment of the present disclosure, the viewer is permitted to perform an operation to the target popular comment content, so as to achieve the posting of the target popular comment content, thereby reducing the operation complexity for the viewer to input the target popular comment content to the live streaming room.

In an example of the embodiment of the present disclosure, when a certain condition is satisfied, displaying the popular comment content is terminated.

For example, after the target popular comment content is posted on the live streaming interface, displaying the popular comment content may be terminated. Or, when time of displaying the popular comment content reaches a pre-set time, displaying the popular comment content is terminated. It is not needed for the viewer to manually close the displayed popular comment content, and therefore, the operation complexity for the viewer is reduced.

In an example of the embodiment of the present disclosure, upon receiving a switching instruction, the terminal device switches between displaying the popular comment content and displaying an input control, where the input control is used for inputting custom comment content.

A typical input control may be a virtual keyboard displayed on a screen.

In the embodiment of the present disclosure, switching between displaying the popular comment content and displaying the input control can be implemented, so that the viewer can input not only the popular comment content, but also the custom comment content. In this way, simultaneous display of the popular comment content and the input control can be avoided, which is helpful to save a screen display area.

Certainly, the popular comment content and the input control may be displayed simultaneously, so as to reduce the viewer's operation of switching between the popular comment content and the input control, which is helpful to reduce the operation complexity.

It may be understood that, in a practical application, the mode through which the popular comment content and the input control are displayed may be set according to the practical application scenario. For example, when a screen of the terminal device is relatively small, switching between displaying the popular comment content and displaying the input control may be adopted; and when the screen of the terminal device is relatively large, the popular comment content and the input control may be displayed simultaneously.

In an example of the embodiment of the present disclosure, S102 includes the following steps.

S1021: sequencing the at least one piece of popular comment content according to a count of the at least one piece of popular comment content in the current counting period.

It should be understood that, the sequencing may be in a descending or ascending order.

S1022: scroll-displaying, in one target area on the live streaming interface of the live streaming room, the at least one piece of popular comment content, according to the sequencing, where a preset number of pieces of popular comment content are displayed in the target area, and the preset number is greater than or equal to 1.

The scroll-displaying means displaying different popular comment content alternately in the target area of the live streaming interface, and displaying a preset number of pieces of popular comment content in the target area in each time period, where a time length of this time period is fixed. All of the popular comment content, after being displayed according to the sequence, are displayed once again according to the sequence, and the cycle is repeated as such.

Figure 6:
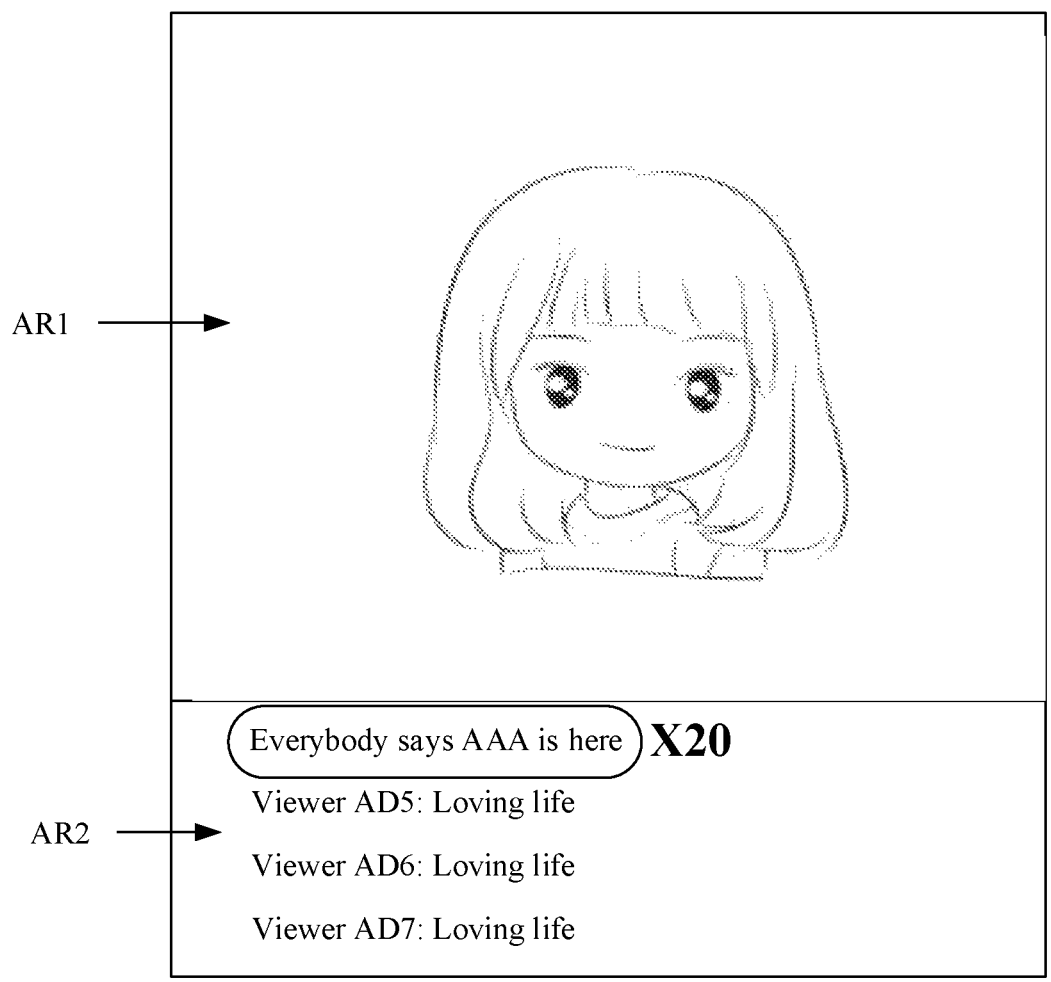

The mentioned target area may be at any position on the live streaming interface, for example, the comment display area or an area outside the comment display area. For example, FIG. 5 and FIG. 6 illustratively show schematic diagrams of live streaming interfaces corresponding to two time instants t1 and t2 respectively provided by an embodiment of the present disclosure, where t1<t2. It can be seen that, both the popular comment content "Loving life" in FIG. 5 and the popular comment content "AAA is here" in FIG. 6 are displayed in the comment display area AR2, and the preset number corresponding to the popular comment content in FIGS. 5 and 6 is 1. If the popular comment content includes only "Loving life" and "AAA is here", "Loving life" and "AAA is here" are then displayed alternately in a plurality of subsequent time periods.

It should be understood that there may be a time interval $Vt1$ between time instant t1 and time instant t2, and a duration of displaying popular comment content may be $Vt2$, where $Vt2<Vt1$. When $Vt2=Vt1$, upon displaying one piece of popular comment content for a duration of $Vt2$, a next piece of popular comment content is immediately displayed without any idle time period in between; when $Vt2<Vt1$, after an idle time period of $Vt1-Vt2$ following the duration of $Vt2$ for displaying one piece of popular comment content, a next piece of popular comment content is displayed.

It can be seen that the mentioned target area is a sub-area of the comment display area on the live streaming interface, and a sub-area other than the target area, in the comment display area is for displaying the real-time comment content in the live streaming room, for example, in FIG. 5, "Loving life" posted by viewer AD2 and viewer AD3, and "AAA is here" posted by viewer AD4, and in FIG. 6, "Loving life" posted by viewers AD5, AD6, and AD7.

In the embodiment of the present disclosure, the popular comment content and the real-time comment content can be distinguishingly displayed in the comment display area. Displaying of comment content in a same area is helpful to improve the cleanness of the live streaming interface.

In an example of the embodiment of the present disclosure, the popular comment content and the real-time comment content in the live streaming room are alternately displayed in the target area.

The real-time comment content may be displayed in the idle time period of $Vt1-Vt2$ between any two pieces of popular comment content. As shown in FIG. 5, the popular comment content "Loving life" begins to be displayed at time instant t1. After "Loving life" has been displayed for the time period of $Vt2$, the real-time comment content is displayed. After the real-time comment content has been displayed for the time period of $Vt1-Vt2$, as shown in FIG. 6, the popular comment content "AAA is here" is displayed at time instant t2.

The user is a viewer who enters the live streaming room.

In an example of the embodiment of the present disclosure, the method further includes:

for one piece of target popular comment content in the popular comment content, when a count of the target popular comment content in each of a succession of counting periods is greater than or equal to the count threshold value, increasing a count threshold value corresponding to the target popular comment content.

In the embodiment of the present disclosure, an initial value may be set for the count threshold value according to a practical application scenario, and the count threshold value may be dynamically adjusted over time according to the count in each of a succession of counting periods ahead of the current counting period. When the count of one piece of target popular comment content in each of a succession of counting periods is greater than or equal to the count threshold value, the target popular comment content is displayed on the live streaming interface in a succession of counting periods, the count threshold value for the target popular comment content may be increased. For example, the count threshold value of the target popular comment content may be increased by a certain number of times, where the number of times may be fixed, and may also be determined according to the number of successive counting periods in which the count of the popular comment content is greater than or equal to the count threshold value. For example, the number of times may be fixed as 2, or may be the number of successive counting periods.

Figure 7:
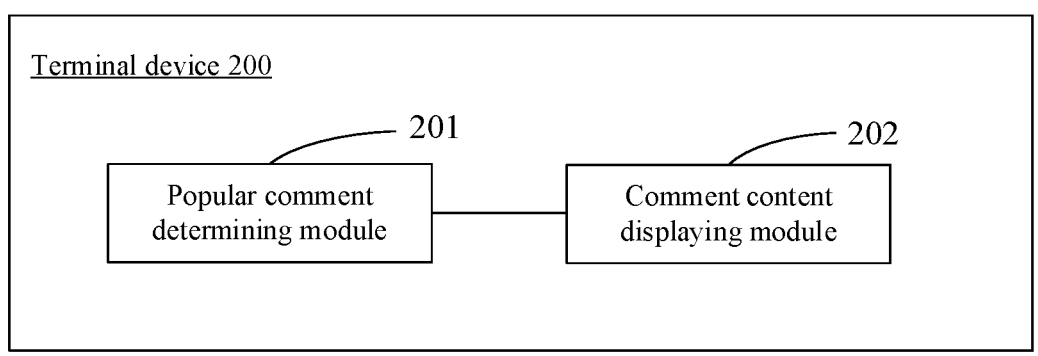
FIG. 7 is a structural block diagram of a terminal device provided by an embodiment of the present disclosure.

Corresponding to the live streaming interface display method according to the foregoing embodiments, FIG. 7 is a structural block diagram of a terminal device provided by an embodiment of the present disclosure. For the convenience of description, only the parts related to the embodiments of the disclosure are illustrated. With reference to FIG. 7, the mentioned terminal device 200 includes a popular comment determining module 201 and a comment content displaying module 202, where the popular comment determining module 201 is configured to determine at least one piece of popular comment content in the live streaming room in a current counting period; and the comment content displaying module 202 is configured to distinguishingly display, on a live streaming interface of the live streaming room, the popular comment content and real-time comment content in the live streaming room.

In an example of the embodiment of the present disclosure, the comment content displaying module 202 is further configured to:

upon receiving an operation instruction to a comment input area on the live streaming interface, display the popular comment content on the live streaming interface of the live streaming room.

In an example of the embodiment of the present disclosure, the terminal device 200 further includes:

a real-time comment content determining module, configured to, upon receiving an operation instruction to one piece of target popular comment content from the popular comment content, display, on the live streaming interface of the live streaming room, the target popular comment content as real-time comment content.

In an example of the embodiment of the present disclosure, the terminal device 200 further includes:

a popular comment content display terminating module, configured to terminate displaying the popular comment content.

In an example of the embodiment of the present disclosure, the popular comment content is displayed in a preset distance range from the comment input area.

In an example of the embodiment of the present disclosure, the terminal device 200 further includes:

a display switching module, configured to, upon receiving a switching instruction, switch between displaying the popular comment content and displaying an input control, where the input control is used for inputting custom comment content.

In an example of the embodiment of the present disclosure, the comment content displaying module 202 is further configured to:

sequence the at least one piece of popular comment content according to a count of the at least one piece of popular comment content in the current counting period; and scroll-display, in one target area on the live streaming interface of the live streaming room, the at least one piece of popular comment content, according to the sequencing, where a preset number of pieces of popular comment content are displayed in the target area, and the preset number is greater than or equal to 1.

In an example of the embodiment of the present disclosure, the target area is a sub-area of a comment display area on the live streaming interface, and the real-time comment content in the live streaming room is displayed in a sub-area other than the target area, in the comment display area.

In an example of the embodiment of the present disclosure, the popular comment content and the real-time comment content in the live streaming room are alternately displayed in the target area.

In an example of the embodiment of the present disclosure, a length of the popular comment content is less than or equal to a length threshold value.

In an example of the embodiment of the present disclosure, the popular comment content includes at least one of the following:

comment content, a count of which in the current counting period is greater than or equal to a count threshold value; at least one piece of comment content at a front position of a ranking in a descending order according to the count.

In an example of the embodiment of the present disclosure, the terminal device 200 further includes:

a count threshold value increasing module, configured to, for one piece of target popular comment content in the popular comment content, when a count of the target popular comment content in each of a succession of counting periods is greater than or equal to the count threshold value, increase a count threshold value corresponding to the target popular comment content.

In an example of the embodiment of the present disclosure, a label is further displayed on the live streaming interface, where the label is used to distinguish the popular comment content from the real-time comment content.

In an example of the embodiment of the present disclosure, at least one of the following is further displayed on the live streaming interface: a count of the popular comment content in the current counting period; a count in a unit time, which is determined according to the count and the current counting period; a count of the popular comment content since creation of the live streaming room to a current time.

The terminal device provided by the embodiments of the present disclosure can be used to implement the technical solutions in the foregoing method embodiments as shown in FIG. 2. The implementation principles and technical effects thereof are similar, and details will not be repeatedly described in the embodiment herein.

Figure 8:
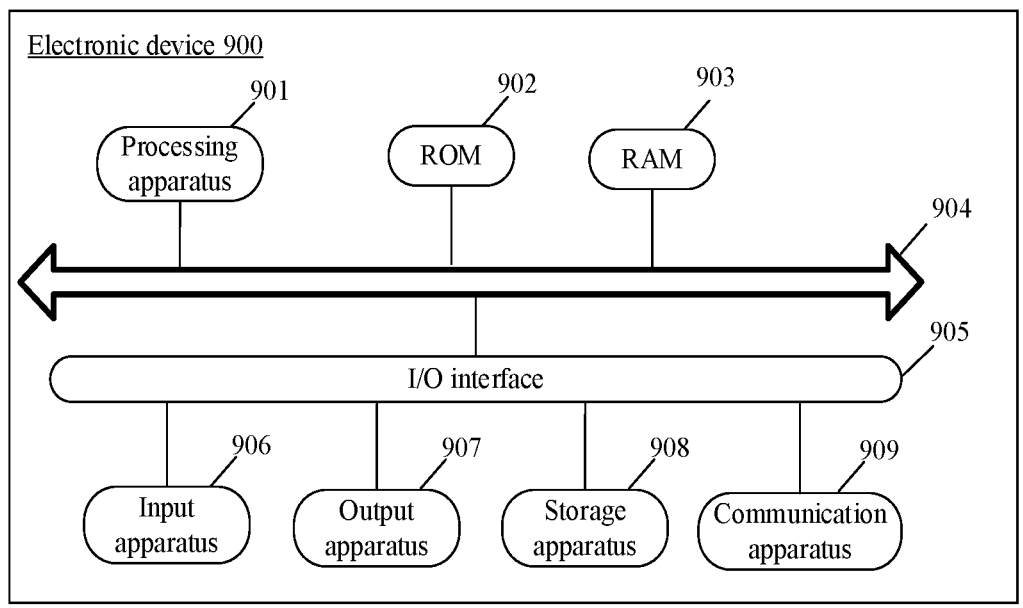
FIG. 8 is a schematic hardware structural diagram of an electronic device provided by an embodiment of the present disclosure.

With reference to FIG. 8, which shows a schematic structural diagram of an electronic device 900 for implementing an embodiment of the present disclosure, the electronic device 900 may be a terminal device. The terminal device may include, but not limited to, mobile terminals such as a mobile phone, a notebook computer, a digital broadcast receiver, a personal digital assistant (PDA), a tablet computer, a portable media player (PMP), a vehicle-mounted terminal (such as a vehicle-mounted navigation terminal), etc., and stationary terminals such as a digital TV, a desktop computer, etc. The electronic device as shown in FIG. 8 is only an example, which should not impose any limitation on the function and application scope of the embodiments of the present disclosure.

As shown in FIG. 8, the electronic device 900 may include a processing apparatus (e.g., a central processing unit, a graphics processor, etc.) 901 which may perform various appropriate actions and processes according to a program stored in a read only memory (ROM) 902 or a program loaded from a storage apparatus 908 into a random access memory (RAM) 903. Various programs and data necessary for the operation of the electronic device 900 are further stored in the RAM 903. The processing apparatus 901, ROM 902, and RAM 903 are connected to each other through a bus 904. And an input/output (I/O) interface 905 is also connected to the bus 904.

Generally, the following apparatuses may be connected to the I/O interface 905: an input apparatus 906 including, for example, a touch screen, a touchpad, a keyboard, a mouse, a camera, a microphone, an accelerometer, a gyroscope, etc.; an output apparatus 907 including, for example, a liquid crystal display (LCD), a speaker, a vibrator, etc.; a storage apparatus 908 including, for example, a magnetic tape, a hard disk or the like; and a communication apparatus 909. The communication apparatus 909 may allow the electronic device 900 to perform wireless or wired communication with other devices to exchange data. Although FIG. 8 shows the electronic device 900 having various apparatuses, it should be understood that not all of the illustrated apparatuses are required to be implemented or provided. More or fewer apparatuses may alternatively be implemented or provided.

Particularly, according to an embodiment of the present disclosure, the processes described above with reference to the flowcharts may be implemented as a computer software program. For example, an embodiment of the present disclosure includes a computer program product including a computer program carried on a computer-readable medium, where the computer program includes program codes for performing the method illustrated in the flowchart. In such embodiments, the computer program may be downloaded from a network and installed via the communication apparatus 909, or installed from the storage apparatus 908, or installed from the ROM 902. When the computer program is executed by the processing apparatus 901, the above-mentioned functions limited in the method according to the embodiments of the present disclosure are executed.

It should be noted that the computer-readable medium described in the present disclosure may be a computer-readable signal medium or a computer-readable storage medium or any combination thereof. The computer-readable storage medium for example may be, but not limited to, an electrical, a magnetic, an optical, an electromagnetic, an infrared, or a semiconductor system, apparatus or device, or any combination thereof. More specific examples of the computer-readable storage medium may include, but not limited to, an electrically connected portable computer disk with one or more wires, a hard disk, a random access memory (RAM), a read only memory (ROM), an erasable programmable read only memory (Electrically Erasable Programmable Read-Only Memory, EPROM or a flash memory), an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in a baseband or as part of a carrier wave, carrying computer-readable program codes therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program codes included on the computer-readable medium may be transmitted through any suitable medium including, but not limited to, an electrical wire, an optical fiber cable, a radio frequency (RF), etc., or any suitable combination thereof.

The above-mentioned computer-readable medium may be included in the above-mentioned electronic device; or may exist alone without being assembled into the electronic device.

The above-mentioned computer-readable medium carries one or more computer programs, and when the above-mentioned one or more computer programs are executed by the electronic device, the electronic device is enabled to implement the methods according to the foregoing embodiments. The computer programs include computer program codes, and the computer program codes for performing an operation of the present disclosure may be written in one or more programming languages or a combination thereof, where the above programming languages include an object-oriented programming language, such as Java, Smalltalk, and C++, as well as a conventional procedural programming language, such as "C" or similar programming languages. The program codes may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (LAN) or a wide area network (WAN), or may be connected to an external computer (e.g., connected via the Internet using an Internet service provider).

The flowchart and block diagrams in the figures illustrate the architecture, functionality, and operation of possible implementations of the system, method and computer program product according to various embodiments of the present disclosure. In this regard, each block in the flowcharts or block diagrams may represent a module, a program segment, or a portion of codes that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in the reverse order, depending upon the functionality involved. It also should be noted that each block of the block diagrams and/or flowcharts, or a combination of blocks in the block diagrams and/or flowcharts may be implemented in a special purpose hardware-based system that perform a specified function or operation, or may be implemented in a combination of special purpose hardware and a computer instruction.

The involved units described in embodiments of the present disclosure may be implemented by means of software, and may also be implemented by means of hardware. Names of these units do not constitute a limitation on the units per se under certain circumstances. For example, a first acquiring unit can also be described as "a unit for acquiring at least two internet protocol addresses".

The foregoing functions described herein may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and more.

In the context of the present disclosure, a computer-readable medium may be a tangible medium that may contain or store a program for use by or in connection with an instruction execution system, apparatus or device. The computer-readable medium may be a computer-readable signal medium or a computer-readable storage medium. The computer-readable medium may include, but not limited to, an electronic, a magnetic, an optical, an electromagnetic, an infrared, or a semiconductor system, apparatus, or device, or any suitable combination of the foregoing. More specific examples of the computer-readable storage medium would include electrically connected portable computer disks based on one or more wires, hard disks, a random access memory (RAM), a read only memory (ROM), an erasable programmable read only memory (EPROM or a flash memory), fiber optics, portable compact disk read only memory (CD-ROM), optical storage devices, magnetic storage devices, or any suitable combination of the foregoing.

In a first example of a first aspect, an embodiment of the present disclosure provides a live streaming interface display method. The method is applied to a terminal device and the terminal device accesses a live streaming room. The method includes:

determining at least one piece of popular comment content in the live streaming room in a current counting period; and distinguishingly displaying, on a live streaming interface of the live streaming room, the popular comment content and real-time comment content in the live streaming room.

Based on the first example of the first aspect, in a second example of the first aspect, distinguishingly displaying, on the live streaming interface of the live streaming room, the popular comment content and the real-time comment content includes:

upon receiving an operation instruction to a comment input area on the live streaming interface, displaying the popular comment content on the live streaming interface of the live streaming room.

Based on the second example of the first aspect, in a third example of the first aspect, the method further includes:

upon receiving an operation instruction to one piece of target popular comment content from the popular comment content, displaying, on the live streaming interface of the live streaming room, the target popular comment content as real-time comment content.

Based on the third example of the first aspect, in a fourth example of the first aspect, after displaying, on the live streaming interface of the live streaming room, the target popular comment content as the real-time comment content, the method further includes:

terminating displaying the popular comment content.

Based on the third example of the first aspect, in a fifth example of the first aspect, the popular comment content is displayed in a preset distance range from the comment input area.

Based on the second example of the first aspect, in a sixth example of the first aspect, the method further includes:

upon receiving a switching instruction, switching between displaying the popular comment content and displaying an input control, where the input control is used for inputting custom comment content.

Based on any one of the first to sixth examples in the first aspect, in a seventh example of the first aspect, distinguishingly displaying, on the live streaming interface of the live streaming room, the popular comment content and the real-time comment content in the live streaming room includes:

sequencing the at least one piece of popular comment content according to a count of the at least one piece of popular comment content in the current counting period; and scroll-displaying and scrolling, in one target area on the live streaming interface of the live streaming room, the at least one piece of popular comment content, according to the sequencing, where a preset number of pieces of popular comment content are displayed in the target area, and the preset number is greater than or equal to 1.

Based on the seventh example of the first aspect, in an eighth example of the first aspect, the target area is a sub-area of a comment display area on the live streaming interface, and the real-time comment content in the live streaming room is displayed in a sub-area other than the target area, in the comment display area.

Based on the eighth example of the first aspect, in an ninth example of the first aspect, the popular comment content and the real-time comment content in the live streaming room are alternately displayed in the target area.

Based on any one of the first to sixth examples in the first aspect, in an eleventh example of the first aspect, a length of the popular comment content is less than or equal to a length threshold value.

Based on any one of the first to sixth examples in the first aspect, in a twelfth example of the first aspect, where the popular comment content includes at least one of the following:

comment content, a count of which in the current counting period is greater than or equal to a count threshold value; at least one piece of comment content at a front position of a ranking in a descending order according to the count.

Based on the twelfth example of the first aspect, in a thirteenth example of the first aspect, the method further includes:

for one piece of target popular comment content in the popular comment content, when a count of the target popular comment content in each of a succession of counting periods is greater than or equal to the count threshold value, increasing a count threshold value corresponding to the target popular comment content.

Based on any one of the first to sixth examples in the first aspect, in a fourteenth example of the first aspect, a label is further displayed on the live streaming interface, where the label is used to distinguish the popular comment content from the real-time comment content.

Based on any one of the first to sixth examples in the first aspect, in a fifteenth example of the first aspect, at least one of the following is further displayed on the live streaming interface:

a count of the popular comment content in the current counting period; a count in a unit time, which is determined according to the count and the current counting period; a count of the popular comment content since creation of the live streaming room to a current time.

In a first example of a second aspect, provided is a terminal device, where the terminal device accesses a live streaming room, and includes:

a popular comment determining module, configured to determine at least one piece of popular comment content in the live streaming room in a current counting period; and a comment content displaying module, configured to distinguishingly display, on a live streaming interface of the live streaming room, the popular comment content and real-time comment content in the live streaming room.

Based on the first example of the second aspect, in a second example of the second aspect, the comment content displaying module is further configured to:

upon receiving an operation instruction to a comment input area on the live streaming interface, display the popular comment content on the live streaming interface of the live streaming room.

Based on the second example of the second aspect, in a third example of the second aspect, the terminal device further includes:

a real-time comment content determining module, configured to, upon receiving an operation instruction to one piece of target popular comment content from the popular comment content, display, on the live streaming interface of the live streaming room, the target popular comment content as real-time comment content.

Based on the third example of the first aspect, in a fourth example of the first aspect, the terminal device further includes:

a popular comment content display terminating module, configured to terminate displaying the popular comment content.

Based on the third example of the second aspect, in a fifth example of the second aspect, the popular comment content is displayed in a preset distance range from the comment input area.

Based on the second example of the second aspect, in a sixth example of the second aspect, the terminal device further includes:

a display switching module, configured to, upon receiving a switching instruction, switch between displaying the popular comment content and displaying an input control, where the input control is used for inputting custom comment content.

Based on any one of the first to sixth examples in the second aspect, in a seventh example of the second aspect, the comment content displaying module is further configured to:

sequence the at least one piece of popular comment content according to a count of the at least one piece of popular comment content in the current counting period; and scroll-display, in one target area on the live streaming interface of the live streaming room, the at least one piece of popular comment content, according to the sequencing, where a preset number of pieces of popular comment content are displayed in the target area, and the preset number is greater than or equal to 1.

Based on the seventh example of the second aspect, in an eighth example of the second aspect, the target area is a sub-area of a comment display area on the live streaming interface, and the real-time comment content in the live streaming room is displayed in a sub-area other than the target area, in the comment display area.

Based on the eighth example of the second aspect, in an ninth example of the second aspect, the popular comment content and the real-time comment content in the live streaming room are alternately displayed in the target area.

Based on any one of the first to sixth examples in the second aspect, in a eleventh example of the second aspect, a length of the popular comment content is less than or equal to a length threshold value.

Based on any one of the first to sixth examples in the second aspect, in a twelfth example of the second aspect, the popular comment content includes at least one of the following:

comment content, a count of which in the current counting period is greater than or equal to a count threshold value; at least one piece of comment content at a front position of a ranking in a descending order according to the count.

Based on the twelfth example of the second aspect, in a thirteenth example of the second aspect, the terminal device further includes:

a count threshold value increasing module, configured to, for one piece of target popular comment content in the popular comment content, when a count of the target popular comment content in each of a succession of counting periods is greater than or equal to the count threshold value, increase a count threshold value corresponding to the target popular comment content.

Based on any one of the first to sixth examples in the second aspect, in a fourteenth example of the second aspect, a label is further displayed on the live streaming interface, where the label is used to distinguish the popular comment content from the real-time comment content.

Based on any one of the first to sixth examples in the second aspect, in a fifteenth example of the second aspect, at least one of the following is further displayed on the live streaming interface: a count of the popular comment content in the current counting period; a count in a unit time, which is determined according to the count and the current counting period; a count of the popular comment content since creation of the live streaming room to a current time.

In a third aspect, an embodiment of the present disclosure provides an electronic device, including: at least one processor and a memory, where the memory stores computer-executed instructions; and the at least one processor executes the computer-executed instructions stored in the memory, to cause the electronic device to implement the method according to the foregoing first aspect.

In a fourth aspect, an embodiment of the present disclosure provides a computer-readable storage medium, storing computer-executed instructions which, when being executed by a computing device, causes the computing device to implement the method according to the foregoing first aspect.

In a fifth aspect, an embodiment of the present disclosure provides a computer program configured to implement the method according to the foregoing first aspect.

The above descriptions are merely preferred embodiments of the present disclosure and illustrations of an applied technical principle. The person skilled in the art should understand that the disclosure scope involved in the present disclosure is not limited to a technical solution formed by a specific combination of the above-mentioned technical features, and should also cover other technical solutions formed by any combination of the above technical features or their equivalents without departing from the above disclosure concept, for example, a technical solution formed by a mutual replacement between the above features and the technical features with similar functions (but not limited to) disclosed in the present disclosure.

In addition, although operations are depicted in a particular order, it should not be construed as requiring these operations to be performed in the specific order shown or in sequential order. Under a certain circumstance, multitasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to a structural feature and/or a methodological action, it should be understood that the subject matter defined in the appended claims is not necessarily limited to the specific features or actions described above. On the contrary, the specific feature and action described above are merely an example form of implementing the claims.

The invention claimed is:

1. A live streaming interface display method, comprising:
   determining comment content satisfying a preset condition in a live streaming room in a current counting period; and
   distinguishingly displaying, on a live streaming interface of the live streaming room, the comment content satisfying the preset condition and real-time comment content in the live streaming room;
   wherein the comment content satisfying the preset condition comprises at least one of the following:
      comment content, a count of which in the current counting period is greater than or equal to a count threshold value; comment content at a front position of a ranking in a descending order according to the count; and
   wherein the method further comprises:
      for target comment content in the comment content satisfying the preset condition, when a count of the target comment content in each of a succession of counting periods is greater than or equal to the count threshold value, increasing the count threshold value corresponding to the target comment content.

2. The method according to claim 1, wherein distinguishingly displaying, on the live streaming interface of the live streaming room, the comment content satisfying the preset condition and the real-time comment content comprises:
   upon receiving an operation instruction to a comment input area on the live streaming interface, displaying the comment content satisfying the preset condition on the live streaming interface of the live streaming room.

3. The method according to claim 2, further comprising:
   upon receiving an operation instruction to target comment content from the comment content satisfying the preset condition, displaying, on the live streaming interface of the live streaming room, the target comment content as real-time comment content.

4. The method according to claim 3, wherein after displaying, on the live streaming interface of the live streaming room, the target comment content as the real-time comment content, the method further comprises:
   terminating displaying the comment content satisfying the preset condition.

5. The method according to claim 3, wherein the comment content satisfying the preset condition is displayed in a preset distance range from the comment input area.

6. The method according to claim 2, further comprising:
   upon receiving a switching instruction, switching between displaying the comment content satisfying the preset condition and displaying an input control, wherein the input control is used for inputting custom comment content.

7. The method according to claim 1, wherein distinguishingly displaying, on the live streaming interface of the live streaming room, the comment content satisfying the preset condition and the real-time comment content in the live streaming room comprises:
sequencing the comment content satisfying the preset condition according to a count of the comment content satisfying the preset condition in the current counting period; and
scroll-displaying, in one target area on the live streaming interface of the live streaming room, the comment content satisfying the preset condition, according to the sequencing, wherein a preset number of comment content satisfying the preset condition is displayed in the target area, and the preset number is greater than or equal to 1.

8. The method according to claim 7, wherein the target area is a sub-area of a comment display area on the live streaming interface, and the real-time comment content in the live streaming room is displayed in a sub-area other than the target area, in the comment display area.

9. The method according to claim 8, wherein the comment content satisfying the preset condition and the real-time comment content in the live streaming room are alternately displayed in the target area.

10. The method according to claim 1, wherein a length of the comment content satisfying the preset condition is less than or equal to a length threshold value.

11. The method according to claim 1, wherein a label is further displayed on the live streaming interface, wherein the label is used to distinguish the comment content satisfying the preset condition from the real-time comment content.

12. The method according to claim 1, wherein at least one of the following is further displayed on the live streaming interface:
a count of the comment content satisfying the preset condition in the current counting period; a count in a unit time, which is determined according to the count and the current counting period; a count of the comment content satisfying the preset condition since creation of the live streaming room to a current time.

13. An electronic device, comprising:
at least one processor and a memory,
wherein the memory stores computer-executed instructions;
wherein the at least one processor executes the computer-executed instructions stored in the memory, to cause the electronic device to implement the steps of:
determining comment content satisfying a preset condition in a live streaming room in a current counting period; and
distinguishingly displaying, on a live streaming interface of the live streaming room, the comment content satisfying the preset condition and real-time comment content in the live streaming room;
wherein the comment content satisfying the preset condition comprises at least one of the following:
comment content, a count of which in the current counting period is greater than or equal to a count threshold value; comment content at a front position of a ranking in a descending order according to the count; and wherein the at least one processor executes the computer-executed instructions stored in the memory to cause the electronic device to implement the step of:
for target comment content in the comment content satisfying the preset condition, when a count of the target comment content in each of a succession of counting periods is greater than or equal to the count threshold value, increasing the count threshold value corresponding to the target comment content.

14. The electronic device according to claim 13, wherein the at least one processor executes the computer-executed instructions stored in the memory to cause the electronic device to implement the step of:
upon receiving an operation instruction to a comment input area on the live streaming interface, displaying the comment content satisfying the preset condition on the live streaming interface of the live streaming room.

15. The electronic device according to claim 14, wherein the at least one processor executes the computer-executed instructions stored in the memory to cause the electronic device to further implement the step of:
upon receiving an operation instruction to target comment content from the comment content satisfying the preset condition, displaying, on the live streaming interface of the live streaming room, the target comment content as real-time comment content.

16. The electronic device according to claim 15, wherein the at least one processor executes the computer-executed instructions stored in the memory to cause the electronic device to further implement the step of:
terminating displaying the comment content satisfying the preset condition.

17. The electronic device according to claim 15, wherein the comment content satisfying the preset condition is displayed in a preset distance range from the comment input area.

18. A non-transitory computer-readable storage medium, storing computer-executed instructions which, when being executed by a computing device, cause the computing device to implement the steps of:
determining comment content satisfying the preset condition in a live streaming room in a current counting period; and
distinguishingly displaying, on a live streaming interface of the live streaming room, the comment content satisfying the preset condition and real-time comment content in the live streaming room;
wherein the comment content satisfying the preset condition comprises at least one of the following:
comment content, a count of which in the current counting period is greater than or equal to a count threshold value; comment content at a front position of a ranking in a descending order according to the count; and
wherein the computer-executed instructions, when being executed by the computing device, cause the computing device to implement the step of:
for target comment content in the comment content satisfying the preset condition, when a count of the target comment content in each of a succession of counting periods is greater than or equal to the count threshold value, increasing the count threshold value corresponding to the target comment content.

* * * * *